United States Patent
Chen

(10) Patent No.: US 10,832,295 B2
(45) Date of Patent: Nov. 10, 2020

(54) AMPLIFIER SELECTION DEVICE COMPRISING ACCESSORY SELECTING FUNCTION

(71) Applicant: FANUC CORPORATION, Yamanashi (JP)

(72) Inventor: Jianzhou Chen, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 149 days.

(21) Appl. No.: 16/051,490

(22) Filed: Aug. 1, 2018

(65) Prior Publication Data

US 2019/0095966 A1  Mar. 28, 2019

(30) Foreign Application Priority Data

Sep. 22, 2017  (JP) ................ 2017-182842

(51) Int. Cl.
*G06Q 30/06* (2012.01)
*G06Q 50/00* (2012.01)

(52) U.S. Cl.
CPC ............. *G06Q 30/06* (2013.01); *G06Q 50/00* (2013.01)

(58) Field of Classification Search
None
See application file for complete search history.

(56) References Cited

U.S. PATENT DOCUMENTS 9,213,326 B2 * 12/2015 Matsumura ............ G05B 15/02
2013/0317633 A1  11/2013 Matsumura et al.

FOREIGN PATENT DOCUMENTS

| CN | 106712590 A | 5/2017 |
| CN | 107037747 A | 8/2017 |
| DE | 112012006162 B4 | 3/2017 |
| EP | 1251444 A1 | 10/2002 |
| JP | 2002-215929 A | 8/2002 |
| JP | 2005-78561 A | 3/2005 |
| JP | 2006-260350 A | 9/2006 |
| WO | 2004/029845 A1 | 4/2004 |
| WO | 2008/139800 A1 | 11/2008 |

OTHER PUBLICATIONS

Suscheck et al. "AUTOSPEC: Automatic Motor Specification System", Oct. 10, 1992, 3 pages. (Year: 1992).*

* cited by examiner

*Primary Examiner* — Suzanne Lo
(74) *Attorney, Agent, or Firm* — Hauptman Ham, LLP

(57) ABSTRACT

An amplifier selection device includes: a storage configured to store identification information and specifications of motor and amplifier; a display controller configured to display a motor selection command input section and a motor list; a motor selector configured to select a motor in accordance with a selection command; an amplifier selector configured to select an amplifier that satisfies specifications of a motor; an accessory information storage configured to store identification information of an accessory, identification information of an amplifier compatible with the accessory, and supplementary information; an accessory selector configured to select an accessory compatible with a selected amplifier by referring to the accessory information storage; and an accessory list display controller configured to display an accessory list of a selected accessory; wherein the display controller is configured to display a wiring diagram including the selected accessory, an amplifier, and a motor connected together.

3 Claims, 14 Drawing Sheets

FIG. 2A

| MOTOR IDENTIFICATION INFORMATION | CONTINUOUS RATED CURRENT |
|---|---|
| MOTOR A | 5 [A] |
| MOTOR B | 10 [A] |
| MOTOR C | 15 [A] |
| MOTOR D | 20 [A] |
| MOTOR E | 25 [A] |
| MOTOR F | 30 [A] |

FIG. 2B

| AMPLIFIER IDENTIFICATION INFORMATION | CONTINUOUS RATED CURRENT |
|---|---|
| AMPLIFIER A | 5 [A] |
| AMPLIFIER B | 10 [A] |
| AMPLIFIER C | 15 [A] |
| AMPLIFIER D | 20 [A] |
| AMPLIFIER E | 25 [A] |
| AMPLIFIER F | 30 [A] |

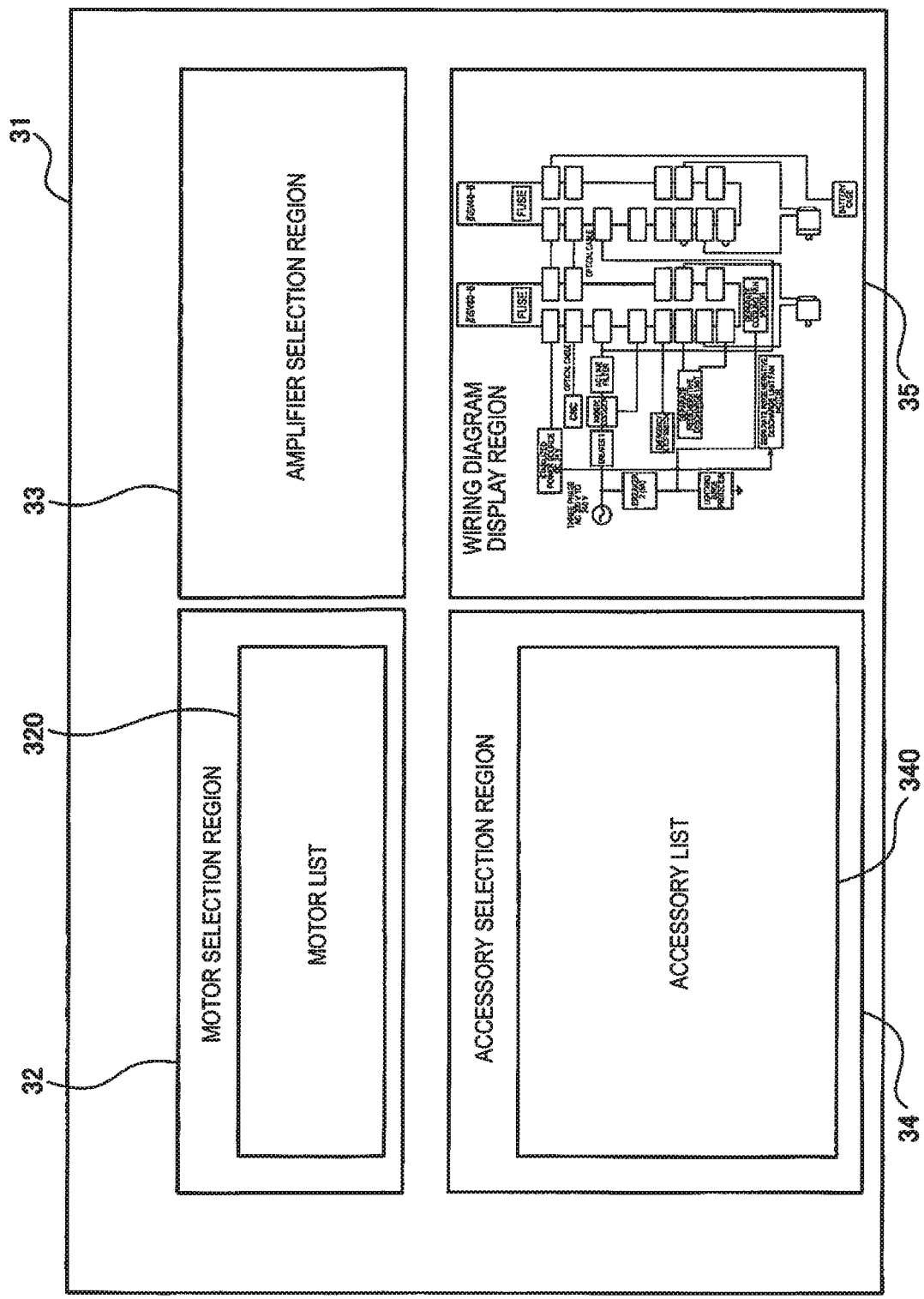

FIG. 4

MOTOR LIST

| MOTOR SELECTION COMMAND INPUT SECTION | MOTOR IDENTIFICATION INFORMATION | CONTINUOUS RATED CURRENT |
|---|---|---|
| ☐ | MOTOR A | 5 [A] |
| ■ | MOTOR B | 10 [A] |
| ☐ | MOTOR C | 15 [A] |
| ☐ | MOTOR D | 20 [A] |
| ■ | MOTOR E | 25 [A] |
| ☐ | MOTOR F | 30 [A] |

ACCESSORY DATABASE

| IDENTIFICATION INFORMATION | MOTOR OR AMPLIFIER COMPATIBLE WITH ACCESSORY | SUPPLEMENTARY INFORMATION |
|---|---|---|
| AC LINE FILTER A | AMPLIFIER A | NONE |
| AC LINE FILTER B | AMPLIFIER B | NONE |
| AC LINE FILTER C | AMPLIFIER C | NONE |
| AC LINE FILTER D | AMPLIFIER D | NONE |
| AC LINE FILTER E | AMPLIFIER E | NONE |
| AC LINE FILTER F | AMPLIFIER F | NONE |
| ... | ... | ... |
| COOLING FAN MOTOR A | AMPLIFIER A | NONE |
| COOLING FAN MOTOR B | AMPLIFIER B | NONE |
| COOLING FAN MOTOR C | AMPLIFIER C | NONE |
| COOLING FAN MOTOR D | AMPLIFIER D | REQUIRED FOR DRIVING MOTOR D AND E |
| COOLING FAN MOTOR E | AMPLIFIER E | REQUIRED FOR DRIVING MOTOR D AND E |
| COOLING FAN MOTOR F | AMPLIFIER F | NONE |
| ... | ... | ... |

FIG. 6

| ACCESSORY LIST | | |
|---|---|---|
| IDENTIFICATION INFORMATION | MOTOR OR AMPLIFIER COMPATIBLE WITH ACCESSORY | SUPPLEMENTARY INFORMATION |
| AC LINE FILTER B | AMPLIFIER B | NONE |
| AC LINE FILTER E | AMPLIFIER E | NONE |
| ...... | | |
| NOISE FILTER B | AMPLIFIER B | STANDARD REQUIRED EQUIPMENT |
| NOISE FILTER E | AMPLIFIER E | STANDARD REQUIRED EQUIPMENT |
| ...... | | |
| COOLING FAN MOTOR B | AMPLIFIER B | NONE |
| COOLING FAN MOTOR E | AMPLIFIER E | REQUIRED FOR DRIVING MOTOR D AND E |
| ...... | | |
| REGENERATIVE DISCHARGE UNIT B | AMPLIFIER B | NONE |
| REGENERATIVE DISCHARGE UNIT E | AMPLIFIER E | NONE |

340

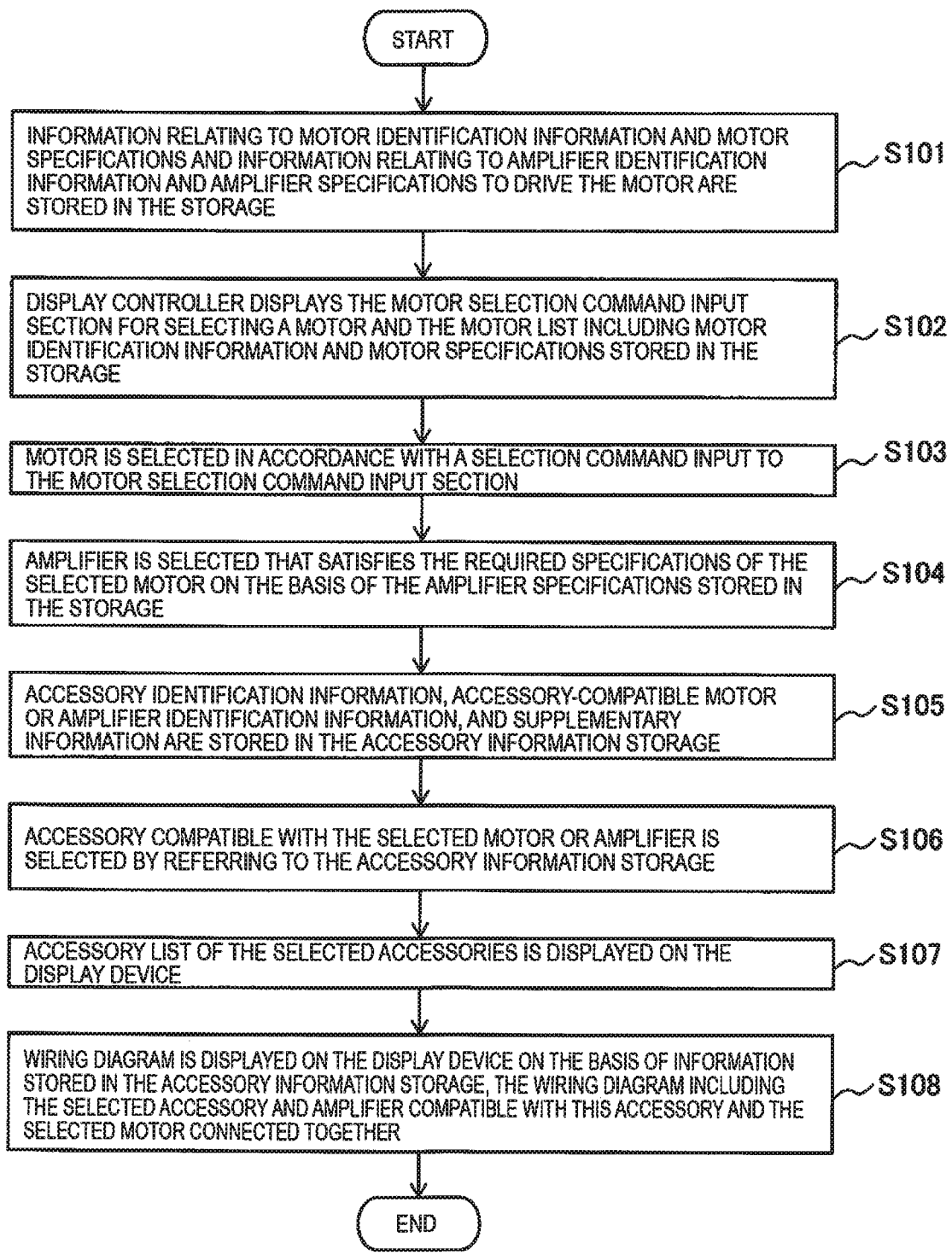

FIG. 9

ACCESSORY DATABASE

| IDENTIFICATION INFORMATION | MOTOR OR AMPLIFIER COMPATIBLE WITH ACCESSORY | SUPPLEMENTARY INFORMATION | NOTE |
|---|---|---|---|
| AC LINE FILTER A | AMPLIFIER A | NONE | REQUIRED ACCESSORY |
| AC LINE FILTER B | AMPLIFIER B | NONE | REQUIRED ACCESSORY |
| AC LINE FILTER C | AMPLIFIER C | NONE | REQUIRED ACCESSORY |
| AC LINE FILTER D | AMPLIFIER D | NONE | REQUIRED ACCESSORY |
| AC LINE FILTER E | AMPLIFIER E | NONE | REQUIRED ACCESSORY |
| AC LINE FILTER F | AMPLIFIER F | NONE | REQUIRED ACCESSORY |
| ... | ... | ... | |
| COOLING FAN MOTOR A | AMPLIFIER A | NONE | FUNCTION-ADDING ACCESSORY |
| COOLING FAN MOTOR B | AMPLIFIER B | NONE | FUNCTION-ADDING ACCESSORY |
| COOLING FAN MOTOR C | AMPLIFIER C | NONE | FUNCTION-ADDING ACCESSORY |
| COOLING FAN MOTOR D | AMPLIFIER D | REQUIRED FOR DRIVING MOTOR D AND E | FUNCTION-ADDING ACCESSORY |
| COOLING FAN MOTOR E | AMPLIFIER E | REQUIRED FOR DRIVING MOTOR D AND E | FUNCTION-ADDING ACCESSORY |
| COOLING FAN MOTOR F | AMPLIFIER F | NONE | FUNCTION-ADDING ACCESSORY |
| ... | ... | ... | |

FIG. 11A

REQUIRED ACCESSORY LIST 341

| ORDER SELECTION COMMAND INPUT SECTION | IDENTIFICATION INFORMATION | MOTOR OR AMPLIFIER COMPATIBLE WITH ACCESSORY | SUPPLEMENTARY INFORMATION |
|---|---|---|---|
| ☐ | AC LINE FILTER B | AMPLIFIER B | NONE |
| ■ | AC LINE FILTER E | AMPLIFIER E | NONE |
| ... | ... | ... | |
| ■ | COOLING FAN MOTOR E | AMPLIFIER E | REQUIRED FOR DRIVING MOTOR D AND E |
| ... | ... | ... | |
| ☐ | REGENERATIVE DISCHARGE UNIT B | AMPLIFIER B | NONE |
| ■ | REGENERATIVE DISCHARGE UNIT E | AMPLIFIER E | NONE |

FIG. 11B

FUNCTION-ADDING ACCESSORY LIST 342

| ORDER SELECTION COMMAND INPUT SECTION | IDENTIFICATION INFORMATION | MOTOR OR AMPLIFIER COMPATIBLE WITH ACCESSORY | SUPPLEMENTARY INFORMATION |
|---|---|---|---|
| ■ | COOLING FAN MOTOR B | AMPLIFIER B | NONE |
| ... | ... | ... | |
| □ | NOISE FILTER B | AMPLIFIER B | STANDARD REQUIRED EQUIPMENT |
| ■ | NOISE FILTER E | AMPLIFIER E | STANDARD REQUIRED EQUIPMENT |

FIG. 12

ACCESSORY ORDER LIST

| IDENTIFICATION INFORMATION | MOTOR OR AMPLIFIER COMPATIBLE WITH ACCESSORY | SUPPLEMENTARY INFORMATION |
|---|---|---|
| AC LINE FILTER E | AMPLIFIER E | NONE |
| COOLING FAN MOTOR B | AMPLIFIER B | NONE |
| COOLING FAN MOTOR E | AMPLIFIER E | REQUIRED FOR DRIVING MOTOR D AND E |
| REGENERATIVE DISCHARGE UNIT E | AMPLIFIER E | NONE |
| NOISE FILTER E | AMPLIFIER E | STANDARD REQUIRED EQUIPMENT |

AMPLIFIER SELECTION DEVICE COMPRISING ACCESSORY SELECTING FUNCTION

RELATED APPLICATIONS

The present application claims priority of Japanese Application Number 2017-182842, filed on Sep. 22, 2017, the disclosure of which is hereby incorporated by reference herein in its entirety.

BACKGROUND OF THE INVENTION

1. Field of the Invention

The present invention relates to an amplifier selection device and particularly relates to an amplifier selection device including an accessory selecting function.

2. Description of the Related Art

When selecting an amplifier and an accessory for the amplifier, if there is a large selection of accessories, selecting an accessory can require a lot of time and effort. In particular, checking the specifications of the accessories when selecting an accessory takes time, and an unsuitable accessory may also be selected.

A known method of selecting motor capacity includes displaying options suitable for a motor and amplifier combination (for example, Japanese Unexamined Patent Publication (Kokai) No. JP 2006-260350 A). Also, a known combination equipment selection system uses a network to select and display equipment which can be combined with equipment in use (for example, International Publication No. WO 2004/029845). Furthermore, a known motor control device selection device, motor control selecting method, computer program for realizing the method, and a storage medium of the computer program are each for selecting a motor control device from options (for example, International Publication No. WO 2008/139800).

SUMMARY OF THE INVENTION

The known technology do not make selection of an accessory for an amplifier easy.

An amplifier selection device according to an embodiment of the present disclosure is for selecting a motor, an amplifier, and an accessory for the amplifier, the amplifier selection device including: a display device; a storage configured to store information relating to motor identification information and motor specifications and information relating to amplifier identification information and amplifier specifications to drive the motor; a display controller configured to display on the display device a motor selection command input section for selecting a motor and a motor list comprising motor identification information and motor specifications stored in the storage; a motor selector configured to select a motor in accordance with a selection command input to the motor selection command input section; an amplifier selector configured to select an amplifier that satisfies specifications of a selected motor on a basis of amplifier specifications stored in the storage; an accessory information storage configured to store identification information of the accessory, identification information of a motor or amplifier compatible with the accessory, and supplementary information; an accessory selector configured to select an accessory compatible with a selected amplifier by referring to the accessory information storage; and an accessory list display controller configured to display on the display device an accessory list of a selected accessory; wherein the display controller is configured to display on the display device a wiring diagram on a basis of information stored in the accessory information storage, the wiring diagram including the selected accessory, an amplifier compatible with the selected accessory, and the selected motor connected together.

BRIEF DESCRIPTION OF THE DRAWINGS

The objects, features and advantages of the invention will become more apparent from the following description of the embodiments in connection with the accompanying drawings, wherein:

FIG. 2A is an example table of a database including information relating to motors stored in a storage of the amplifier selection device according to the first embodiment;

FIG. 2B is an example table of a database including information relating to amplifiers stored in the storage of the amplifier selection device according to the first embodiment;

FIG. 3 illustrates an example display of a display device of the amplifier selection device according to the first embodiment;

FIG. 4 is an example table of a motor list displayed on the display device of the amplifier selection device according to the first embodiment;

FIG. 5 is an example table of a database including information relating to an accessory stored in an accessory information storage of the amplifier selection device according to the first embodiment;

FIG. 6 is an example table of an accessory list displayed on the display device by an accessory list display controller of the amplifier selection device according to the first embodiment;

FIG. 8 is a flowchart for describing the operational procedure of the amplifier selection device according to the first embodiment;

FIG. 9 is an example table of an accessory database including information relating to an accessory stored in an accessory information storage of an amplifier selection device according to a second embodiment;

FIG. 11A is an example table of a required accessory list displayed on a display device by an accessory list display controller of the amplifier selection device according to the second embodiment;

FIG. 11B is an example table of a function-adding accessory list displayed on the display device by the accessory list display controller of the amplifier selection device according to the second embodiment;

FIG. 12 is an example table of an accessory order list displayed on the display device by the accessory list display controller of the amplifier selection device according to the second embodiment.

DETAILED DESCRIPTION

Hereinafter, an amplifier selection device according to embodiments of the invention is described with reference to the drawings. However, the technical scope of the invention is not limited to these embodiments and includes the invention described in the claims and elements equivalent thereto.

Figure 1:
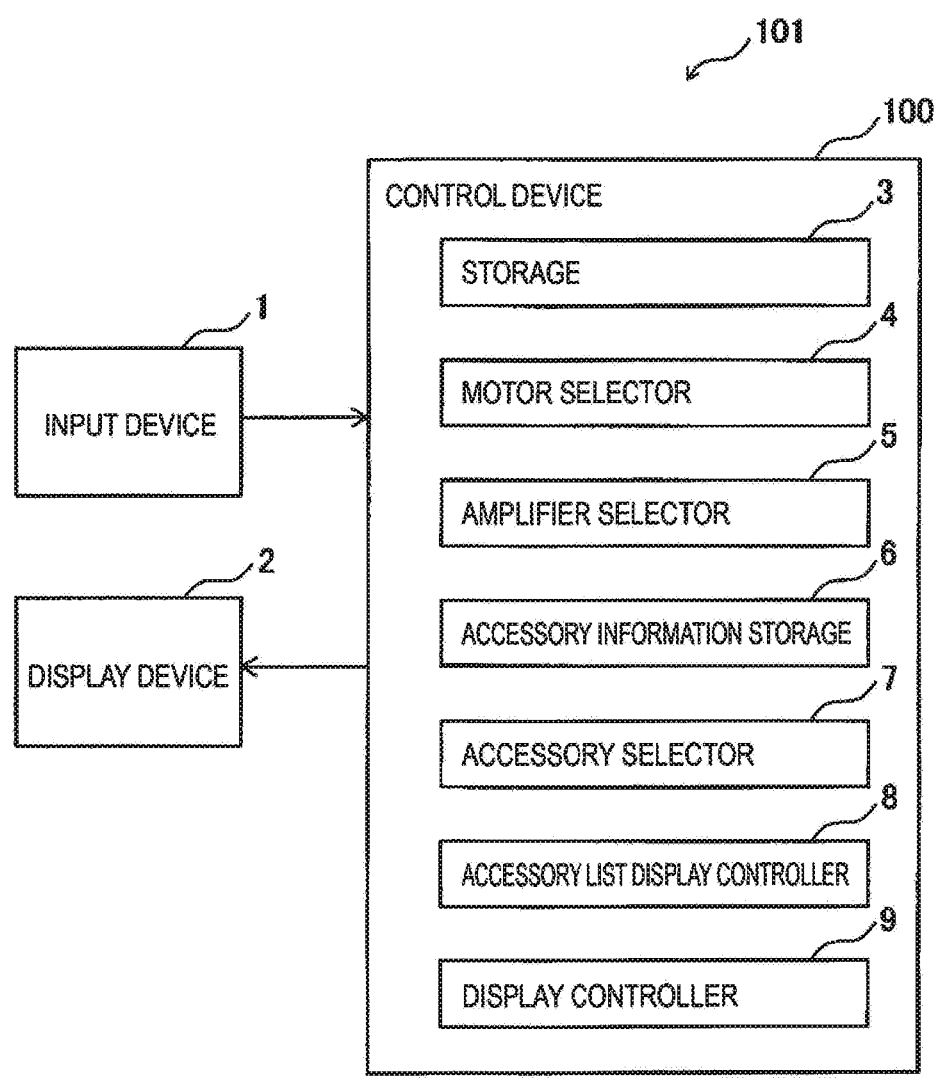
FIG. 1 is a block diagram of an amplifier selection device according to a first embodiment.

An amplifier selection device according to a first embodiment will be described. FIG. 1 is a block diagram of the amplifier selection device according to the first embodiment. The amplifier selection device 101 according to the first embodiment includes an input device 1, a display device 2, and a control device 100 and is configured to select a motor, an amplifier, and an amp accessory.

As the input device 1, for example, a keyboard, a mouse, etc., can be used. Alternatively, a touch panel disposed over the display device 2 can be used as the input device 1. Selection input information generated when the input device 1 is used to input the selection of a desired motor or an accessory to be ordered is input into the control device 100 of the amplifier selection device 101.

As the display device 2, a liquid crystal display device, an organic EL display device, etc., can be used. The display device 2 is configured to display an input screen for information input via the input device 1, a list of amplifiers and a list of accessories selected by the amplifier selection device 101, a wiring diagram including an amplifier and an accessory connected together, etc.

The control device 100 includes a storage 3, a motor selector 4, an amplifier selector 5, an accessory information storage 6, an accessory selector 7, an accessory list display controller 8, and a display controller 9.

The storage 3 is configured to store information relating to motor identification information and motor specifications and information relating to amplifier identification information and amplifier specifications to drive the motor.

FIG. 2A illustrates an example of a database including information relating to motors stored in the storage 3 of the amplifier selection device 101 according to the first embodiment. Information relating to motor identification information and motor required specifications for an amplifier is included in the database including information relating to motors. "Motor identification information" is the model name, model number, etc., of the motors. For example, examples of motor identification information include "Motor A" to "Motor B", and examples of motor required specifications for an amplifier include "continuous rated current". However, these are merely examples, and other specification values, such as short time rated current and maximum current upon acceleration can be selected as motor required specifications.

FIG. 2B illustrates an example of a database including information relating to amplifiers stored in the storage of the amplifier selection device according to the first embodiment. Information relating to amplifier identification information and amplifier specifications to drive the motor is included in the database including information relating to amplifiers.

For example, examples of the amplifier identification information include "Amplifier A" to "Amplifier F" as model names, and examples of amplifier specifications include "continuous rated current". However, these are merely examples, and other specification values, such as short time rated current and maximum current upon acceleration can be selected as amplifier specifications to drive the motor together with motor required specifications.

FIG. 3 illustrates an example display of the display device 2 of the amplifier selection device 101 according to the first embodiment. The display device 2 includes a display screen 31 and can display alphanumerical information, patterns, etc. The display screen 31, for example, can display a motor selection region 32, an amplifier selection region 33, an accessory selection region 34, and a wiring diagram display region 35.

The display controller 9 is configured to display on the display device 2 a motor selection command input section for selecting a motor and a motor list 320 including motor identification information and motor specifications stored in the storage 3.

The motor selector 4 is configured to select a motor in accordance with a selection command input to the motor selection command input section. FIG. 4 illustrates an example of the motor list 320 displayed on the display device 2 of the amplifier selection device 101 according to the first embodiment. The motor list 320 is displayed in the motor selection region 32 on the display screen 31 of the display device 2 illustrated in FIG. 3. The motor selection command input section includes buttons, etc., displaying a plurality of motor identification information in a row. A selection command is input by clicking the displayed buttons. In the example of FIG. 4, the initial state is displayed on the motor selection command input section by a white quadrangular symbol, and clicked and selected motors are displayed by a black quadrangular symbol. For example, "Motor A" to "Motor F" are displayed on the motor selection region 32 as motor identification information, and by clicking the buttons displayed near "Motor B" and "Motor E", "Motor B" and "Motor E" are selected. The configuration of the motor selection command input section is not limited to that of a button and may be a pull-down list or another configuration.

The amplifier selector 5 is configured to select an amplifier that satisfies the specifications of the selected motor on the basis of the amplifier specifications stored in the storage 3. For example, as illustrated in FIG. 4, in the case where a selection command is input for "Motor B" and "Motor E" in the motor selection command input section and these are selected, the required specifications of "Motor B" and "Motor E" for continuous rated current of "10[A]" and "25[A]" found from the database including motor information illustrated in FIG. 2A can be seen. The amplifiers that satisfy these motor required specifications found from the database including amplifier information illustrated in FIG. 2B are "Amplifier B" and "Amplifier E", and these amplifiers are selected.

A list of the selected amplifiers may be displayed in the amplifier selection region 33 of the display device 2 as illustrated in FIG. 3.

The accessory information storage 6 is configured to store accessory identification information, accessory-compatible motor or amplifier identification information, and supplementary information. FIG. 5 illustrates an example of a database (accessory database) including information relating to the accessory stored in the accessory information storage 6 of the amplifier selection device 101 according to the first embodiment. In FIG. 5, "AC line filter" and "Cooling fan motor" are illustrated as examples of accessories, however accessories are not limited thereto. "AC line filter A" to "AC line filter F" and "Cooling fan motor A" to "Cooling fan motor F" are examples of accessory identification information. Additionally, "Amplifier A" to "Amplifier F" are illustrated as amplifiers compatible with accessories "AC line filter A to F" and "Cooling fan motor A to F". The information in the accessory database may also contain supplementary information. Examples of supplementary information include information relating to accessory operational precautions, but supplementary information is limited thereto. For example, for "Cooling fan motor", the example of supplementary information being the information "required for driving Motor D and E" is given, but supplementary information is not limited thereto. The amplifier selection device according to this example includes an accessory selecting function, and when an accessory is selected, the selection is made on the basis of amplifier specifications as well as the motor specifications to be driven by the amplifier. For example, in selecting an accessory such as a sensor and a detector, information relating to the motor specifications such as the top rotation speed of the motor is required.

The accessory selector 7 is configured to select an accessory compatible with the selected amplifier by referring to the accessory information storage 6. The accessory list display controller 8 is configured to display on the display device 2 an accessory list 340 of the selected accessories. The accessory list display controller 8 is preferably configured to display on the display device 2, on the basis of information stored in the accessory information storage 6, the accessory list. 340 including at least accessory identification information, accessory-compatible motor or amplifier identification information, and supplementary information. As illustrated in FIG. 3, the accessory list 340 is displayed in the accessory selection region 34 of the display device 2.

FIG. 6 illustrates an example of the accessory list 340 displayed in the accessory selection region 34 by the accessory list display controller 8 of the amplifier selection device according to the first embodiment. For example, as illustrated in FIG. 4, in the case where a selection command is input for "Motor B" and "Motor E" in the motor selection command input section and these are selected, "Amplifier B" and "Amplifier E" are selected. As amplifier-compatible accessories, "AC line filter B", "AC line filter E", "Cooling fan motor B" and "Cooling fan motor E" are selected by referring to "accessory-compatible motor or amplifier" of the accessory database illustrated in FIG. 5. In a similar manner, "Noise filter B", "Noise filter. E", "Regenerative discharge unit B" and "Regenerative discharge unit E" are selected. In FIG. 6, "AC line filter", "Noise filter", "Cooling fan motor", and "Regenerative discharge unit" are given as examples of accessories, however accessories are not limited thereto. Additionally, as supplementary information included in the accessory list 340, the information for "Noise filter" of "required for standard compliance" is given as an example, but supplementary information is not limited thereto.

In this way, by selecting a desired motor from a list, an amplifier to drive the selected motor is selected and an accessory used with the selected amplifier is selected.

Figure 7:
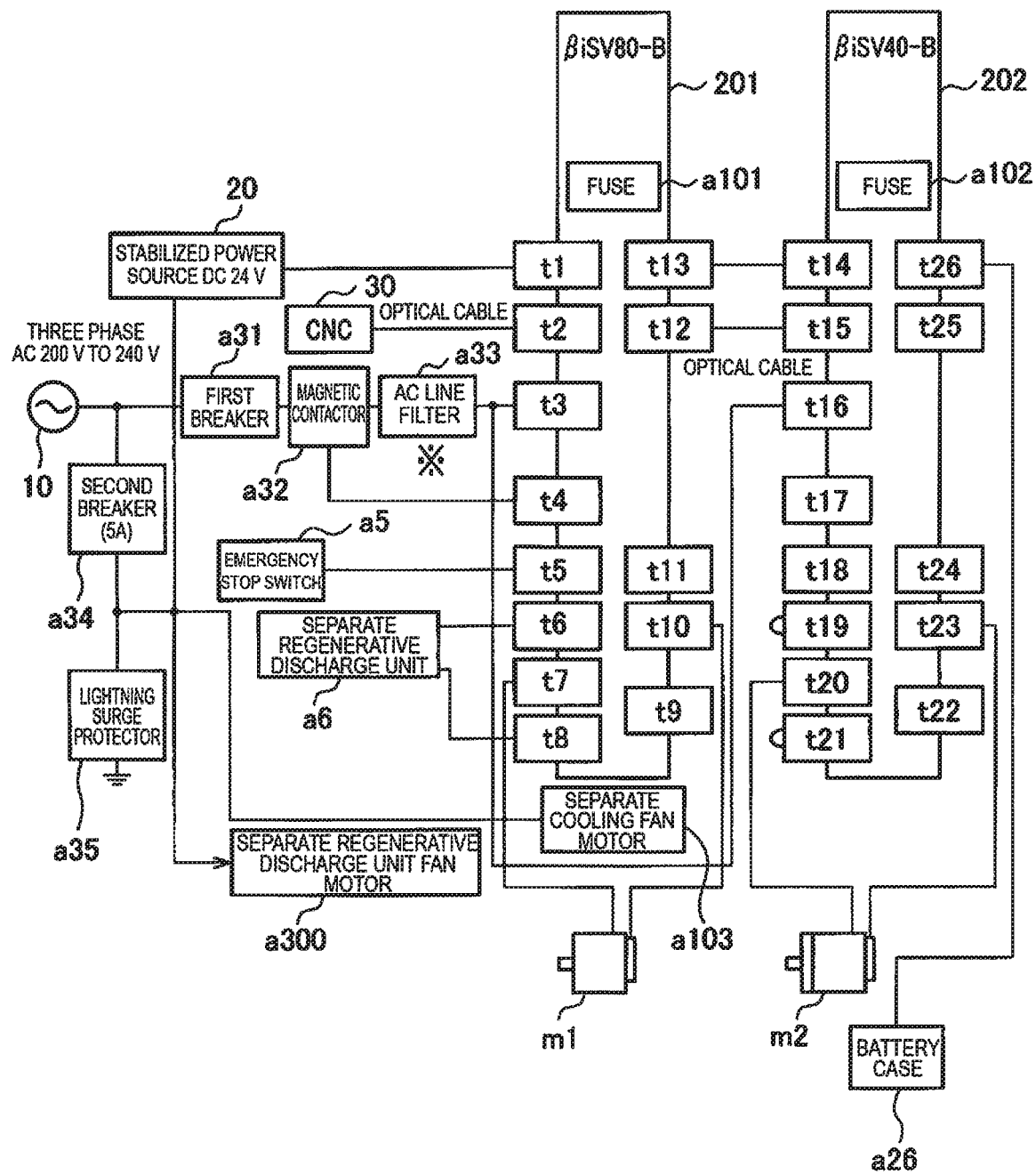
FIG. 7 illustrates an example of a wiring diagram including an amplifier and an accessory connected together which is displayed on the display device by a display controller of the amplifier selection device according to the first embodiment.

The display controller 9 is configured to display on the display device 2 a wiring diagram on the basis of information stored in the accessory information storage 6, the wiring diagram including the selected accessory and amplifier compatible with this accessory and the selected motor connected together. FIG. 7 illustrates an example of a wiring diagram including an amplifier and an accessory connected together which is displayed on the display device by the display controller of the amplifier selection device according to the first embodiment. As illustrated in FIG. 3, the wiring diagram can be displayed in the wiring diagram display region 35. A first amplifier 201 and a second amplifier 202 are provided with terminals t1 to t13 and terminals t14 to t26, respectively. A first motor m1 is connected to the terminal t7 and t10 of the first amplifier 201, and a second motor m2 is connected to the terminal t20 and t23 of the second amplifier 202. An AC line filter a33 is connected to the terminal t3 of the first amplifier 201, an emergency stop switch a5 is connected to the terminal t5, and a separate regenerative discharge unit a6 is connected to the terminal t6 and t8. A first breaker a3 a magnetic contactor a32, a second breaker a34, a lightning surge protector a35, a fan motor for separate regenerative discharge unit a300, and a power source 10 are connected to the AC line filter a33. A battery case a26 is connected to the terminal t26 of the second amplifier 202. A stabilized power source 20 is connected to the terminal t1 of the first amplifier 201, and a computer numerical control (CNC) device 30 is connected to the terminal t2. A first fuse a101 and a separate cooling fan motor a103 are connected to the first amplifier 201, and a second fuse a102 is connected to the second amplifier 202. In the example circuit diagram illustrated in FIG. 7, a system in which one amplifier drives one motor is illustrated, however no such limitation is intended. The system may include a single motor driven by a plurality of amplifiers or may include a plurality of motors driven by a single amplifier. The wiring diagram illustrated in FIG. 7 is an example, and other wiring diagrams can also be displayed.

Next, a method of selecting an amplifier using the amplifier selection device according to the first embodiment will be described. FIG. 8 is a flowchart for describing the operational procedure of the amplifier selection device according to the first embodiment.

Firstly, in step S101, information relating to motor identification information and motor specifications and information relating to amplifier identification information and amplifier specifications to drive the motor are stored in the storage 3. An example of the database is illustrated in FIGS. 2A and 2B, Next, in step S102, the display controller 9 displays the motor selection command input section for selecting a motor and the motor list 320 including motor identification information and motor specifications stored in the storage 3.

Then, in step S103, a motor is selected in accordance with a selection command input to the motor selection command input section. An example of the motor list 320 including the motor selection command input section is illustrated in FIG. 4.

Next, in step S104, the amplifier selector 5 selects an amplifier that satisfies the required specifications of the selected motor on the basis of the amplifier specifications stored in the storage 3.

Then, in step S105, accessory identification information, accessory-compatible motor or amplifier identification information, and supplementary information are stored in the accessory information storage 6. An example of the accessory database is illustrated in FIG. 5.

Next, in step S106, the accessory selector 7 selects an accessory compatible with the selected motor or amplifier by referring to the accessory information storage 6.

Then, in step S107, the accessory list display controller 8 displays on the display device 2 the accessory list 340 of the selected accessories. An example of the accessory list 340 is illustrated in FIG. 6.

Next, in step S108, the display controller 9 displays on the display device 2 a wiring diagram on the basis of information stored in the accessory information storage 6, the wiring diagram including the selected accessory and amplifier compatible with this accessory and the selected motor connected together. An example of the wiring diagram is illustrated in FIG. 7.

In this way, according to the amplifier selection device of the first embodiment, an accessory for the amplifier can be easily selected. Additionally, a wiring diagram including the selected accessory and a motor and/or amplifier connected together can be displayed on the display device.

Next, an amplifier selection device according to a second embodiment will be described. The amplifier selection device according to the second embodiment is different from the amplifier selection device according to the first embodiment in that information relating to the accessory stored in the accessory information storage 6 includes information indicating whether the accessory is a required accessory or a function-adding accessory, and in that the accessory list display controller 8 displays on the display device 2, on the basis of information relating to the accessory, the accessory list 340 split into a required accessory list 341 of required accessories and a function-adding accessory list 342 of function-adding accessories. Other than this, the configuration of the amplifier selection device according to the second embodiment is similar to the configuration of the amplifier selection device according to the first embodiment, thus a detailed description is omitted.

FIG. 9 illustrates an example of an accessory database including information relating to the accessory stored in the accessory information storage 6 of the amplifier selection device according to the second embodiment. The accessory database stored in the accessory information storage 6 of the amplifier selection device according to the second embodiment includes in the notes column information as to whether it is a "required accessory" or a "function-adding accessory". In the example illustrated in FIG. 9, "AC line filter A" and "AC line filter F" are "required accessories", and "Cooling fan motor A" and "Cooling fan motor F" are "function-adding accessories", however no such limitation is intended.

Figure 10:
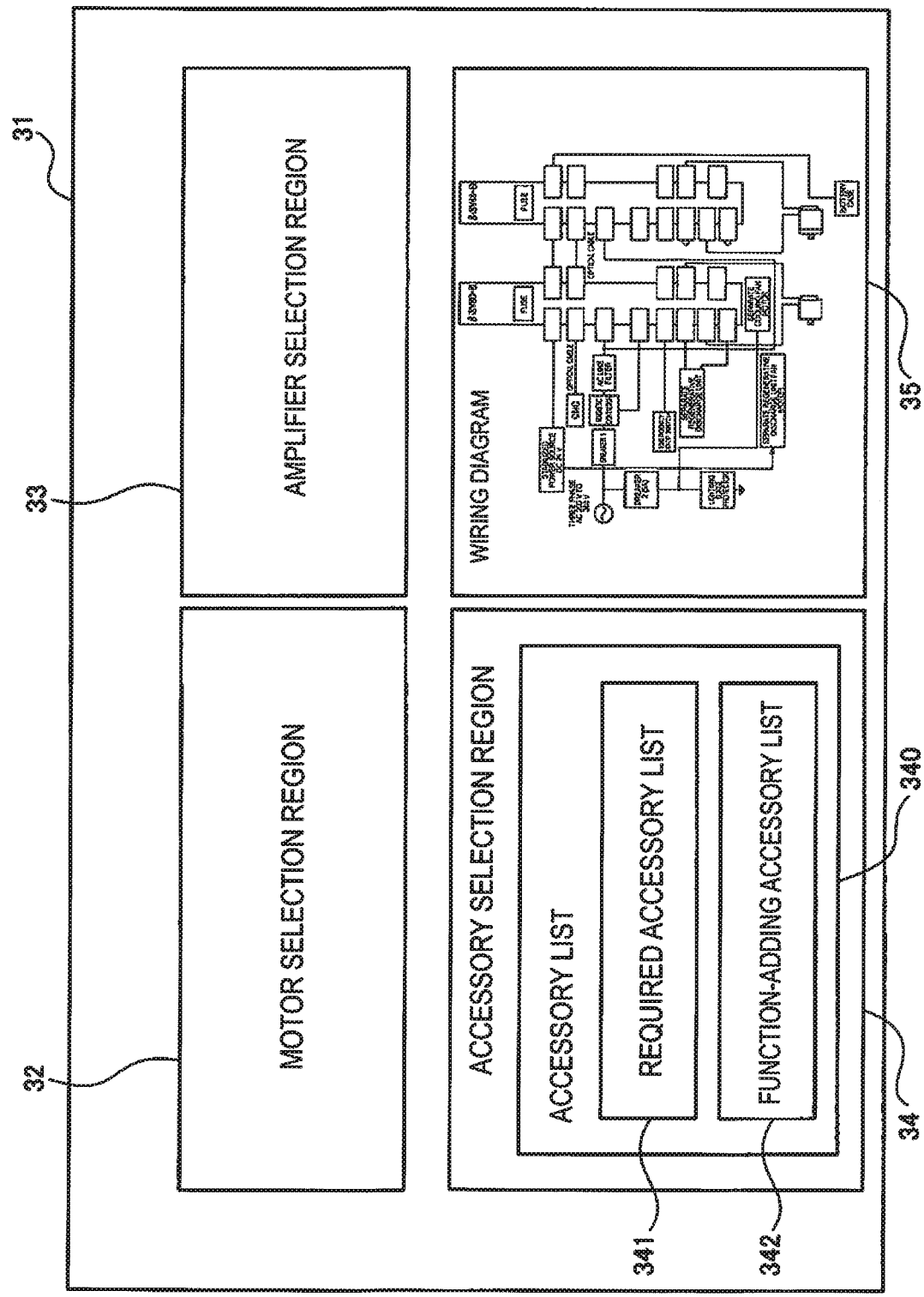
FIG. 10 illustrates an example display of a display device of the amplifier selection device according to the second embodiment.

FIG. 10 illustrates an example display of a display device of the amplifier selection device according to the second embodiment. The accessory list display controller 8 is configured to display in the accessory selection region 34 of the display device 2 the accessory list 340 split into the required accessory list 341 of required accessories and the function-adding accessory list 342 of function-adding accessories.

FIGS. 11A and 11B illustrate examples of the required accessory list 341 and the function-adding accessory list 342 displayed on the display device 2 by the accessory list display controller 8 of the amplifier selection device according to the second embodiment. As illustrated in FIG. 11A, the required accessory list 341 includes "AC line filter B", "AC line filter E", "Cooling fan motor E", "Regenerative discharge unit B", and "Regenerative discharge unit E". As illustrated in FIG. 11B, the function-adding accessory list 342 includes "Cooling fan motor B", "Noise filter B", and "Noise filter E". These are examples and no such limitation is intended. By the accessory list 340 being displayed split into the required accessory list 341 and the function-adding accessory list 342, which accessories are required accessories and which are function-adding accessories can be instantly recognized.

Additionally, the accessory list display controller 8 may be configured to display an order selection command input section configured to accept an order selection command for selecting whether to place an order and may be configured to select as a target order the accessory for which an order selection command is input at the order selection command input section. In the examples of FIGS. 11A and 11B, the initial state is displayed on the order selection command input section by a white quadrangular symbol, and clicked and selected orders are displayed by a black quadrangular symbol. For example, "AC line filter B" and "AC line filter E" are displayed in the accessory selection region 34 as accessory identification information, and by the button near "AC line filter E" being clicked, "AC line filter E" is selected as the order. The configuration of the order selection command input section is not limited to that of a button and may be a pull-down list or another configuration.

In the example illustrated in FIG. 11A, of the items in the required accessory list 341, "AC line filter E", "Cooling fan motor E", and "Regenerative discharge unit E" are selected as an order. Additionally, in the example illustrated in FIG. 11B, of the items in the function-adding accessory list 342, "Cooling fan motor B" and "Noise filter E" are selected as an order. As illustrated in FIGS. 11A and 11B, by the order selection command input section configured to accept an order selection command for selecting whether to place an order being displayed on the required accessory list 341 and the function-adding accessory list 342, an order can be easily selected.

The accessories for which an order selection command is input at the order selection command input section may be consolidated in an accessory order list indicating the selected target orders. FIG. 12 illustrates an example of an accessory order list displayed on the display device 2 by the accessory list display controller 8 of the amplifier selection device according to the second embodiment. The accessory order list can be displayed in the accessory selection region 34 of the display device 2. By the accessory target orders being consolidated in the accessory order list, the orders can be easily recognized.

In the examples illustrated in FIGS. 11A and 11B, the order selection command input section is displayed with the accessory list 340 split into the required accessory list 341 and the function-adding accessory list 342, but no such limitation is intended. For example, as illustrated in FIG. 6, the order selection command input section may be displayed with the accessory list 340 in a state prior to being split into the required accessory list 341 and the function-adding accessory list 342.

Figure 13:
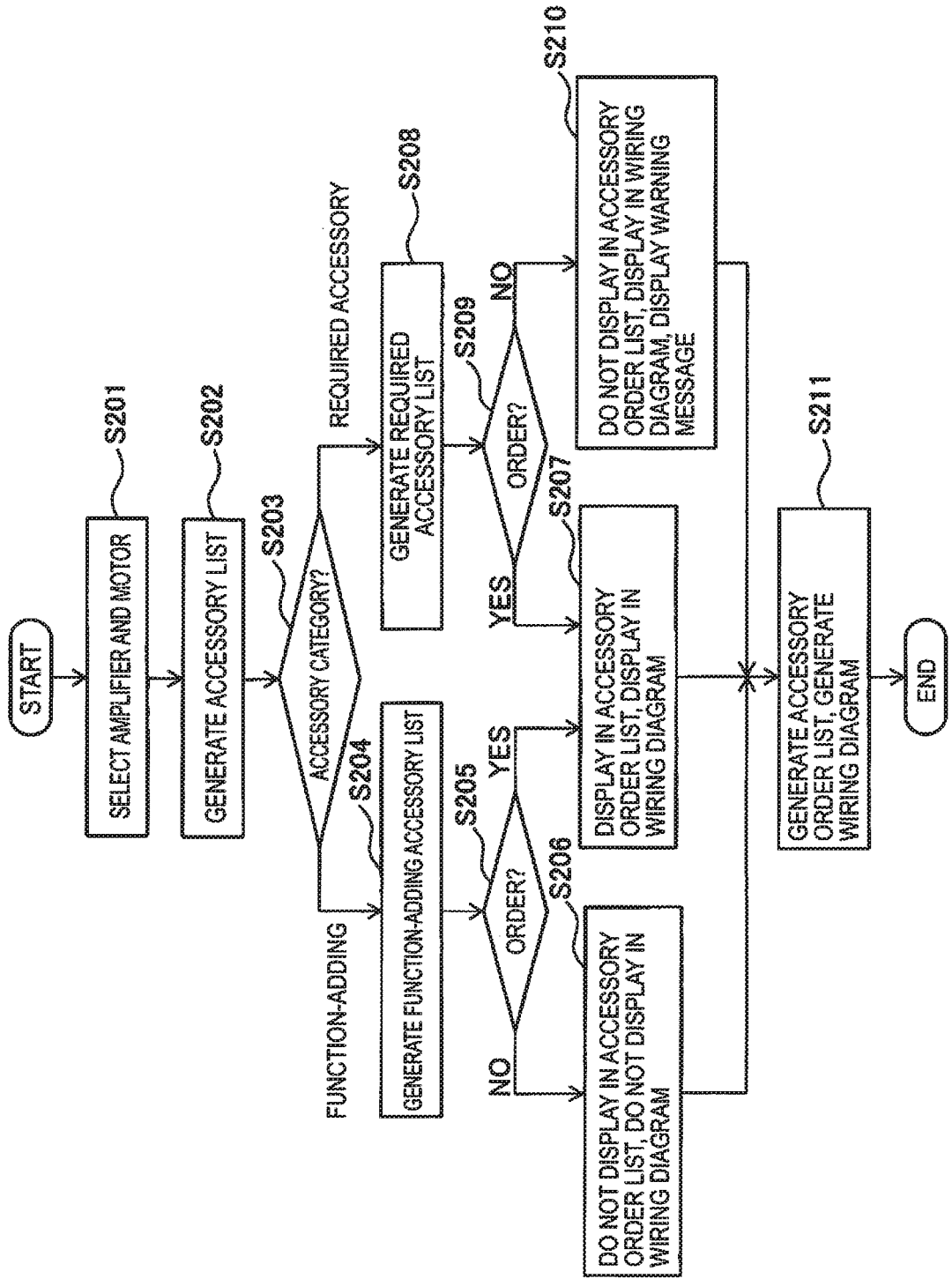
FIG. 13 is a flowchart for describing the operational procedure of the amplifier selection device according to the second embodiment.

Next, a method of selecting an amplifier and an accessory using the amplifier selection device according to the second embodiment will be described. FIG. 13 is a flowchart for describing the operational procedure of the amplifier selection device according to the second embodiment. Firstly, in step S201, the motor selector 4 and the amplifier selector 5 select an amplifier and a motor. The method of selecting an amplifier and a motor includes a procedure similar to that for the first embodiment.

Next, in step S202, the accessory selector 7 generates the accessory list 340 as illustrated in FIG. 6. At this stage, the list is not split into required accessories and function-adding accessories.

Then, in step S203, the accessory list display controller 8 determines whether the type of the accessory is a required accessory or a function-adding accessory on the basis of the accessory database.

In step S204, the accessory list display controller 8 generates the function-adding accessory list 342 of the accessories which are function-adding accessories. The order selection command input section configured to accept an order selection command for selecting whether to place an order is displayed on the function-adding accessory list 342.

Next, in step S205, the accessory list display controller 8 determines whether an accessory listed in the function-adding accessory list 342 has been selected as an order.

In step S206, if no accessories listed in the function-adding accessory list 342 are determined to be orders, the function-adding accessories are not displayed in the accessory order list and not displayed in the wiring diagram. In this way, when a function-adding accessory is not selected as a target order, the accessory list display controller 8 does not display any function-adding accessories in the accessory order list of accessory target orders, and the display controller 9 does not display on the display device 2 a wiring diagram including the function-adding accessory, the amplifier compatible with the function-adding accessory, and the selected motor connected together.

In step S207, if an accessory listed in the function-adding accessory list 342 is determined to be an order, the function-adding accessory is displayed in the accessory order list and is displayed in the wiring diagram. In this way, when at least one function-adding accessory is selected as a target order, the accessory list display controller 8 displays the selected function-adding accessory in the accessory order list of accessory target orders, and the display controller 9 displays on the display device 2 a wiring diagram including the function-adding accessory selected as a target order, the amplifier compatible with the function-adding accessory, and the selected motor connected together.

Additionally, in step S208, the accessory list display controller 8 generates the required accessory list 341 of the accessories which are required accessories. The order selection command input section configured to accept an order selection command for selecting whether to place an order is displayed on the required accessory list 341.

Next, in step S209, the accessory list display controller 8 determines whether an accessory listed in the required accessory list 341 has been selected as an order.

In step S207, if an accessory listed in the required accessory list 341 is determined to be an order, the required accessory is displayed in the accessory order list and is displayed in the wiring diagram. In this way, when at least one required accessory is selected as a target order, the accessory list display controller 8 displays the required accessory selected as a target order in the accessory order list of accessory target orders, and the display controller 9 displays on the display device 2, regardless of whether the required accessory is selected as a target order, a wiring diagram including the required accessory, the amplifier compatible with the required accessory, and the selected motor connected together.

In step S210, if no accessories listed in the required accessory list 341 are determined to be orders, the required accessories are not displayed in the accessory order list, but are displayed in the wiring diagram and a warning message is displayed. In this way, when a required accessory is not selected as a target order, the accessory list display controller 8 does not display any required accessories in the accessory order list of accessory target orders. Additionally, the display controller 9 displays on the display device, regardless of whether the required accessory is selected as a target order, a wiring diagram including the required accessory, the amplifier compatible with the required accessory, and the selected motor, and a warning message requesting for a substitute for the required accessory to be used. For example, as illustrated in FIG. 7, the accessory list display controller 8 may display on the wiring diagram a symbol (for example, "*") marking the accessory subject to a warning message requesting for a substitute to be used (for example, AC line filter a33). Furthermore, a warning message such as "If you do not order this required part, please use a substitute." may also be displayed on or near the wiring diagram. This configuration allows an accessory that requires a substitute to be easily recognized.

Finally, in step S211, an accessory order list and a wiring diagram is generated taking into consideration the accessories determined to be displayed or not displayed in steps S206, S207, and S210.

As described above, according to the amplifier selection device according to this example, the selection of an accessory, which typically has required great time and know-how, can be automated. Additionally, according to the amplifier selection device according to this embodiment, by a wiring diagram being automatically displayed and this wiring diagram be referenced, the possibility of a mistake in the wiring of the amplifier and the accessory can be reduced.

According to an amplifier selection device according to the present disclosure, an accessory for an amplifier can be easily selected.

What is claimed is:

1. An amplifier selection device, for selecting a motor, an amplifier, and an accessory for the amplifier, the amplifier selection device comprising:
   a display device; and
   a control device configured to
      store (i) information relating to motor identification information and motor specifications and (ii) information relating to amplifier identification information and amplifier specifications to drive the motor,
      display on the display device a motor selection command input section for selecting a motor and a motor list comprising the motor identification information and motor specifications,
      select a motor in accordance with a selection command input to the motor selection command input section,
      select an amplifier that satisfies motor specifications-of the selected motor on a basis of amplifier specifications,
      store identification information of an accessory, motor identification information or amplifier identification information of an amplifier compatible with the accessory, and supplementary information,
      select an accessory compatible with the selected amplifier,
      display on the display device an accessory list of the selected accessory, and
      display on the display device a wiring diagram including the selected accessory, the amplifier compatible with the selected accessory, and the selected motor connected together,
   wherein the control device is configured to display on the display device the accessory list including at least the identification information of the accessory, the motor identification information of the selected motor or the amplifier identification information of the amplifier compatible with the accessory, and the supplementary information,
   information relating to the accessory includes information indicating whether the accessory is a required accessory or a function-adding accessory, and
   the control device is configured to
      display on the display device, on a basis of the information relating to the accessory, the accessory list split into a required accessory list of required accessories and a function-adding accessory list of function-adding accessories, display on the display device an order selection command input section configured to accept an order selection command for selecting whether to place an order, select, as a target order, an accessory for which an order selection command is input at the order selection command input section, and in response to not selecting a required accessory as the target order, display on the display device a wiring diagram including the required accessory and the selected motor or the selected amplifier compatible with the required accessory connected together and display a warning message requesting for a substitute for the required accessory to be used.

2. The amplifier selection device according to claim 1, wherein the control device is configured to, in response to selecting at least one required accessory from the required accessories as the target order, display the at least one required accessory in an accessory order list of an accessory target order as a selected target order, and display on the display device a wiring diagram including the at least one required accessory and the selected motor or the selected amplifier compatible with the at least one required accessory connected together.

3. The amplifier selection device according to claim 1, wherein the control device is configured to, in response to selecting at least one function-adding accessory from the function-adding accessories as the target order, display the selected at least one function-adding accessory in an accessory order list of an accessory target order, and display on the display device a wiring diagram including the at least one function-adding accessory selected as the target order, the selected amplifier compatible with the function-adding accessory selected as the target order, and the selected motor connected together.

\* \* \* \* \*